United States Patent [19]
Hanazawa

[11] Patent Number: 6,009,080
[45] Date of Patent: Dec. 28, 1999

[54] ATM EXCHANGE

[75] Inventor: Hiroyuki Hanazawa, Kawasaki, Japan

[73] Assignee: Fujitsu Limited, Kanagawa, Japan

[21] Appl. No.: 09/177,005

[22] Filed: Oct. 22, 1998

[30] Foreign Application Priority Data

Mar. 10, 1998 [JP] Japan .................................. 10-058707

[51] Int. Cl.⁶ .................................................. H04L 12/14
[52] U.S. Cl. ........................... 370/244; 370/253; 370/395
[58] Field of Search ..................... 370/244, 230, 370/395, 236, 235, 252, 253, 228

[56] References Cited

U.S. PATENT DOCUMENTS

| | | | |
|---|---|---|---|
| 5,166,894 | 11/1992 | Saito ........................................ | 370/252 |
| 5,488,607 | 1/1996 | Vinel et al. .............................. | 370/253 |
| 5,677,907 | 10/1997 | Hamada et al. ......................... | 370/253 |
| 5,818,818 | 10/1998 | Soumiya et al. ........................ | 370/252 |
| 5,848,056 | 12/1998 | Meurisse et al. ....................... | 370/252 |

FOREIGN PATENT DOCUMENTS

| | | |
|---|---|---|
| 4-87439 | 3/1992 | Japan . |
| 6-350633 | 12/1994 | Japan . |

*Primary Examiner*—Chau Nguyen
*Assistant Examiner*—Phuongchau Ba Nguyen
*Attorney, Agent, or Firm*—Helfgott & Karas, P.C.

[57] ABSTRACT

A component device (such as an input circuit interface device, a cell multiplexing device, a cell switching device, a cell demultiplexing device or output circuit interface device) in an ATM exchange counts an inflow cell number, a passage cell number and discard cell number. The firmware of the device subtract the passage cell number and the discard cell number from the inflow cell number to find a difference at predetermined interval. If the difference is larger than the predetermined threshold value, the firmware informs the software of fault warning.

8 Claims, 9 Drawing Sheets

FIG. 2

| SOURCE OF FAULT WARNING | TARGET TO BE SWITCHED |
|---|---|
| INPUT CIRCUIT INTERFACE DEVICE | CELL MULTIPLEXING DEVICE |
| CELL MULTIPLEXING DEVICE | CELL MULTIPLEXING DEVICE |
| CELL SWITCHING DEVICE | CELL SWITCHING DEVICE |
| CELL DEMULTIPLEXING DEVICE | CELL DEMULTIPLEXING DEVICE |
| OUTPUT CIRCUIT INTERFACE DEVICE | CELL DEMULTIPLEXING DEVICE |

AUTONOMY-MASSAGE : TO INDICATE THAT DEFECTIVE DEVICE HAS BEEN REPLACED AS A RESULT OF STOP OF CELL TRANSMISSION

ATM EXCHANGE

BACKGROUND OF THE INVENTION

1. Field of the Invention

The present invention relates to an ATM exchange, in particular it relates to a technique to detecting a fault in the ATM exchange.

2. Prior Art

An ATM exchange consists of a plurality of devices such as a cell switching device, a cell multiplexing device, a cell demultiplexing device, and interface devices. Since each of the devices, however, is not provided with a self-detection system for detecting a communication fault, when the communication between the devices is brokendown (generation of a hardware stack), the system cannot detect the fault. And therefore, even if a standby system is prepared, it is not possible for quickly switch the operation from an actual system to a standby system, and the cell flow may be stopped.

An ATM exchange cannot announce a generation of a fault to a maintenance person, and the maintenance person generally knows generation of the fault by reports from subscribers for the first time. As a result, the communication service is interrupted until reports from subscribers, and there is a problem of the maintainability.

SUMMARY OF THE INVENTION

An object of the present invention is to provide an ATM exchange that is able to detect a hardware stack immediately when the stack occurs in any devices of the ATM exchange.

According to an aspect of the present invention, an ATM exchange, which contains a plurality of component devices on a cell passage channel, is characterized in that at least one component device comprises an inflow cell counter that counts inflow cell number into the component device, a discard cell counter that counts discarded cell number at the component device, a passage cell counter that counts outflow cell number from the component device, and a controller that subtracts discard cell number and passage cell number from inflow cell number and issues a fault warning when the difference is larger than predetermined threshold value.

Since the difference is usually smaller than the threshold value when the component device works in normal state, the controller can judge a generation of a fault in a hardware when the difference is larger than the threshold value. Accordingly, the controller can easily detect a generation of a fault and it makes possible the quick restoration.

It is desirable that the controller detects a compensation value that is a number of cells that are actually passing between the inflow cell counter and the passage cell counter in the component device. In that case, the controller should calculate the difference to subtract the discard cell number, the passage cell number and the compensation value from the inflow cell number.

When the compensation value is taken in the consideration, the difference will be zero in the normal operation, the controller can accurately detect the fault based on the difference and it reduces an incorrect decision of the fault.

When the component device is an input circuit interface device, the inflow cell counter is placed in an ATM layer terminating unit that is one unit of the interface device, and the passage cell counter is placed in a cell flow controlling/charging unit, and the discard cell counter is placed in both of the ATM layer terminating unit and the cell flow controlling/charging unit.

With this construction, a hardware fault generated in the input circuit interface device can be easily detected.

When the component device is a cell multiplexing device that contains multistage cell multiplexing units, the inflow cell counter is placed in the first stage cell multiplexing unit, the passage cell counter is placed in the third stage cell multiplexing unit, and the discard cell counter is placed in both of the units at the first stage and the third stage.

With this construction, a hardware fault generated in the cell multiplexing device can be easily detected.

Further, when the component device is a cell switching device that is provided with multistage switching modules, the inflow cell counter is placed in the first stage switching module, the passage cell counter is placed in the third stage switching module, and the discard cell counter is placed in the modules at any stages.

With this construction, a hardware fault generated in the cell switching device can be easily detected.

Still further, when the component device is a cell demultiplexing device, the inflow cell counter is placed in a cell copying unit that copies cells, the passage cell counter is placed in a cell demultiplexing unit, and the discard cell counter is placed in both of the cell copying unit and the cell demultiplexing unit.

With this construction, a hardware fault generated in the cell demultiplexing device can be easily detected.

Yet further, when the component device is an output circuit interface device, the inflow cell counter is placed in a cell flow controlling/charging unit, the passage cell counter and the discard cell counter are placed in an ATM layer terminating unit.

With this construction, a hardware fault generated in the output circuit interface device can be easily detected.

BRIEF DESCRIPTION OF THE DRAWINGS

FIG. 2 is a table showing relationships between sources of the fault warning and targets to be replaced according to the embodiment;

DETAILED DESCRIPTION OF THE PREFERRED EMBODIMENT

An embodiment of the present invention will hereinafter be discussed with reference to the accompanying drawings.

Figure 1:
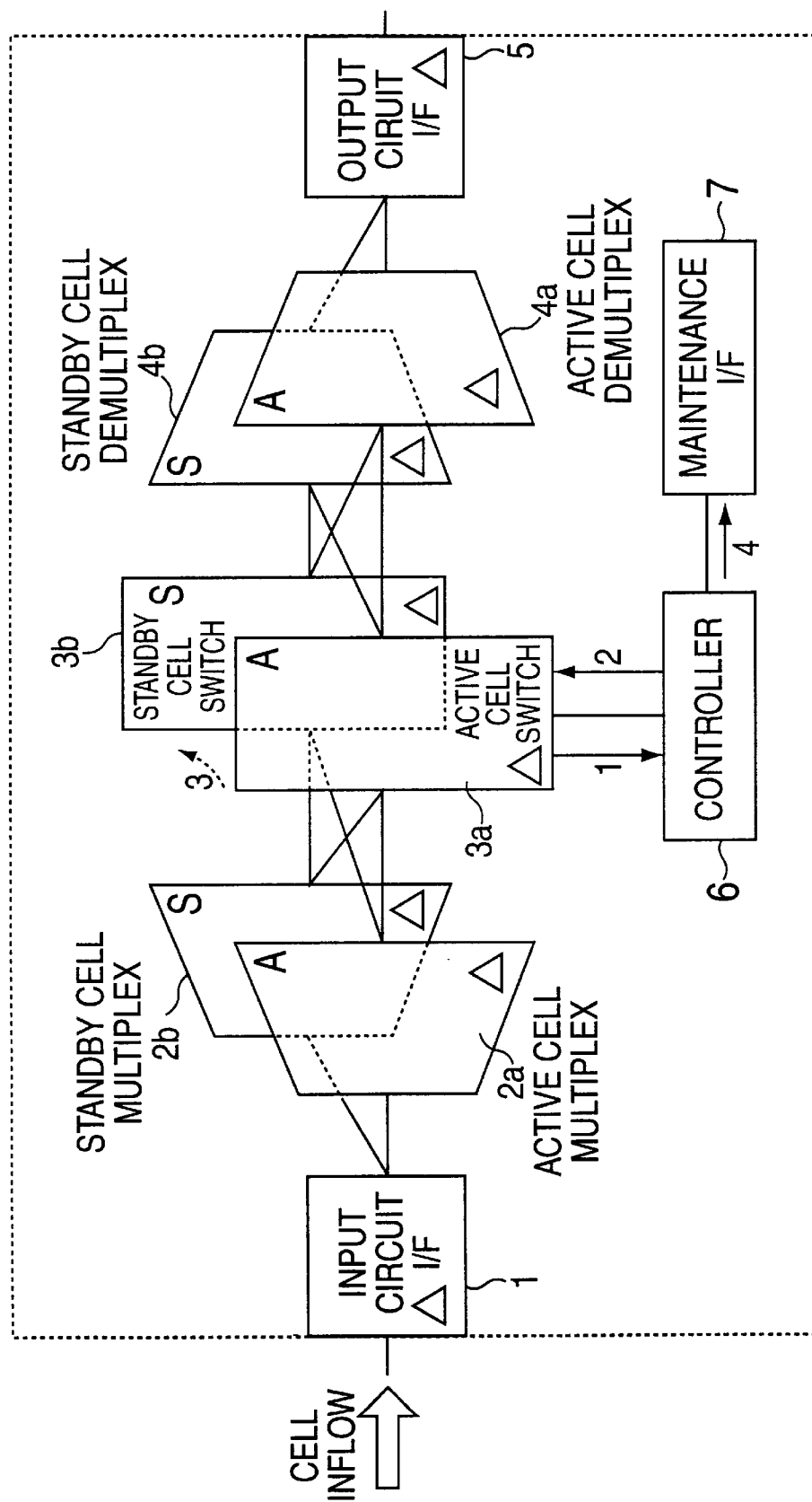
FIG. 1 is a block diagram showing construction of an ATM exchange in an embodiment of the present invention.

As shown in FIG. 1, an ATM exchange of the embodiment comprises an input circuit interface device 1, a pair of cell multiplexing devices 2a and 2b, a pair of cell switching devices 3a and 3b, a pair of cell demultiplexing devices 4a and 4b, an output circuit interface device 5, a controller 6 and a workstation 7 as a maintenance interface device.

The cell multiplexing device 2a, the cell switching device 3a and the cell demultiplexing device 4a form an actual system (A:act), and the devices 2b, 3b and 4b organize a standby system (S:standby). If any faults are generated in the device of the actual system, it is possible to switchover the device of the actual system to that of the standby system. In FIG. 1, the devices that are shown with marks Δ have built-in firmwares.

Figure 9:
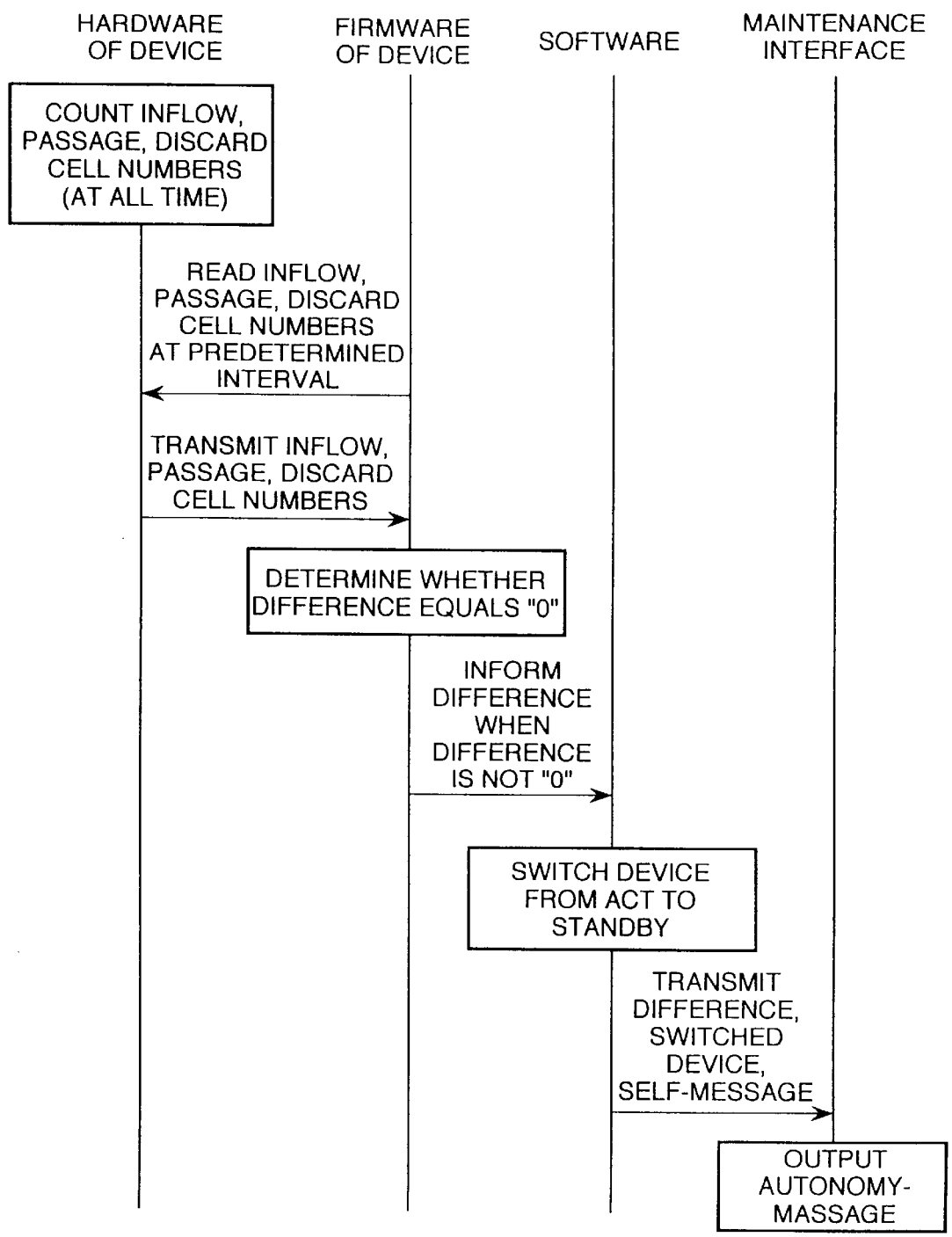
FIG. 9 is a sequential chart showing communication relationships among a hardware of a component device, a firm ware, a software and a maintenance interface.

The software of the controller 6 switches the actual system to the standby system when the firmware informs the fault warning. For example, if the firmware of the cell switching device 3a informs the software of the fault warning, the software switches the actual cell switching device 3a to the standby cell switching device 3b and issues a autonomy-message to the maintenance interface device (WS). This informing process will be described in detail with reference to FIG. 9.

(1) The firmware Δ of the cell switching device 3a calculates the difference D according to the following equation.

$$D = Cin - (Cout + Cdis) - Cco,$$

where

Cin: an inflow cell number,

Cout: a passage cell number,

Cdis: a discarded cell number, and

Cco: a compensation value.

The inflow cell number Cin is counted by an inflow cell counter, the passage cell number Cout is counted by a passage cell counter, and the discarded cell number Cdis is counted by a discard cell counter. The compensation value Cco is a number of cells that are actually passing between the inflow cell counter and the passage cell counter in the component device.

The firmware informs the difference D as the fault warning when the difference D becomes larger than predetermined threshold value. In the embodiment, the compensation value Cco is taken in the consideration to find the difference D, the difference D should be zero in the normal operation. The threshold value is, therefore, equal to zero. The firmware issues the fault warning when the difference D is non-zero value.

(2) The controller 6 immediately issues a command to switch the cell switching device 3a of the actual system to the device 3b of the standby system.

(3) The cell switching device 3a of the actual system switches the operation thereof to the device 3b of the standby system when the switch command is received.

The controller 6 selects the target device to be replaced based on the source of the fault warning. That is, the target device is selected by specifying the device of which firmware issues the fault warning. FIG. 2 shows the relationships between the source of the fault warning and the target to be switched. This relationships are stored in a memory of the controller 6 as a form of table.

According to FIG. 2, when the firmware of the input circuit interface device 1 issues the fault warning, the cell multiplexing device 2a is switched to the device 2b. When the firmware of the cell multiplexing device 2a, the cell switching device 3a or the cell demultiplexing device 4a issues the fault warning, the device that issues the fault warning itself becomes the target to be switched. When the fault warning is issued by the output circuit interface device 5, the cell demultiplexing device 4a is switched to the device 4b.

(4) After the controller 6 issues the switch command, the controller sends the difference D and the autonomy-message to the maintenance interface device 7. The autonomy-message indicates that the defective device has been switched as a result of the stop of the cell transmission. The maintenance interface device (WS) outputs the autonomy-massage to inform a maintenance person of the hardware fault.

Figure 3:
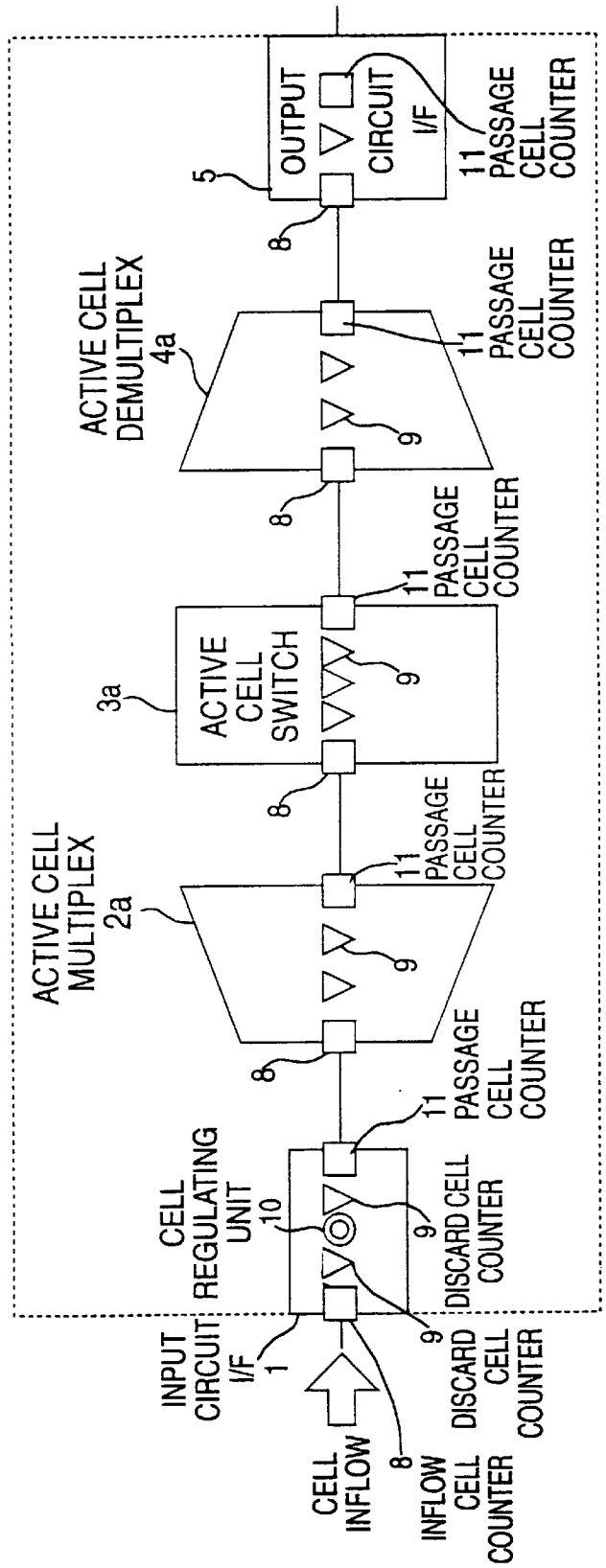
FIG. 3 is a block diagram showing arrangements of cell counters according to the embodiment.

FIG. 3 schematically shows a simplified block diagram of the ATM exchange shown in FIG. 1 with showing arrangements of the cell counters. A symbol ⊙ indicates a cell regulation unit 10 (UPC/NPC:Usage Parameter Control/Network Parameter Control). The cell regulation unit (UPC/UPC) 10 has a function to interrupt the inflow of out-band cells, i.e. to discard the out-band cells. Such the function of the cell regulation unit consists of the control for subscriber's lines (UPC) and the control for transit lines (NPC).

In FIG. 3, a symbol □ represents the inflow cell counter 8 that counts inflow cell number into the component device, a symbol ▽ represents the discard cell counter 9 that counts discarded cell number at the component device, and a symbol ■ represents the passage cell counter 11 that counts outflow cell number from the component device.

Next, a cell counting method in each of devices is described.

Input Circuit Interface Device 1

Figure 4:
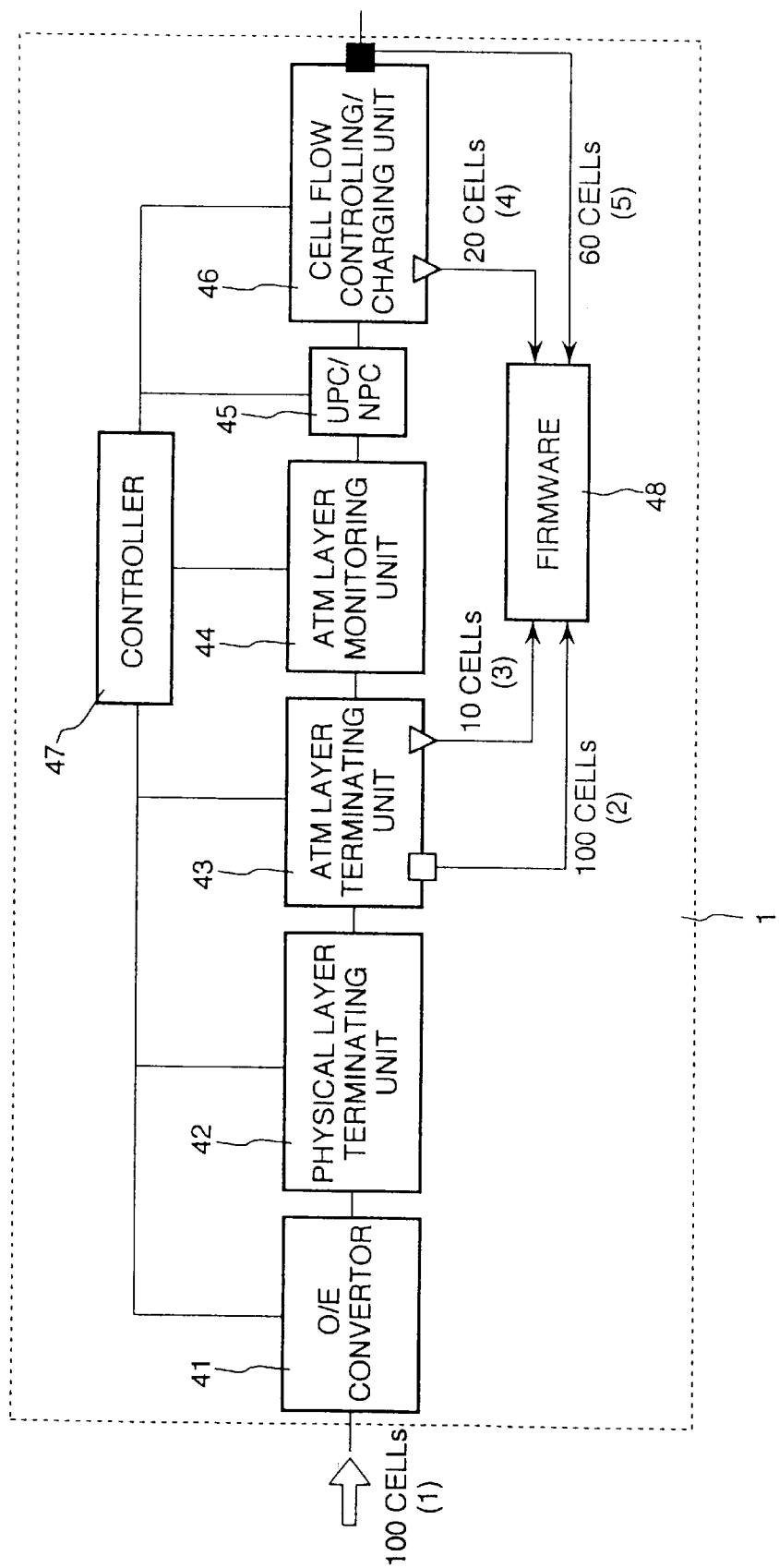
FIG. 4 is a functional block diagram showing construction of an input circuit interface device according to the embodiment.

As shown in FIG. 4, in detail the input circuit interface device 1 comprises a photoelectric converter (O/E) 41 that converts optical signal into electric signal, a physical layer terminating unit 42, an ATM layer terminating unit 43, an ATM layer monitoring unit 44, a cell regulating unit (UPC/UPC) 44, a cell flow controlling/charging unit 46 and a controller 47 that controls the units 41 through 46. Although a firmware 48 is installed in the controller 47, it is shown as a separate block in FIG. 4.

The inflow cell counter 8 (□) and the discard cell counter 9 (▽) are placed in the ATM layer terminating unit 43. The discard cell counter 9 (▽) and the passage cell counter 11 (■) are placed in the cell flow controlling/charging unit 46.

One example of the cell calculation in the input circuit interface device 1 will be explained hereinafter.

It is assumed that five cells are actually passing between the inflow cell counter 8 (□) and the passage cell counter 11 (■) in the input circuit interface device 1. That is, the compensation value Cco equals five.

(1) A hundred (100) cells are input to the input circuit interface device 1.

(2) A inflow cell number Cin (=100 cells) that is counted in the inflow cell counter 8 (□) of the ATM layer terminating unit 43 is informed to the firmware 48.

(3) A discarded cell number Cdis (=10 cells) that is counted in the discard cell counter 9 (▽) is informed to the firmware 48. The discarded cell number Cdis detected in the ATM terminating unit 43 is equal to a cell number discarded in a buffer when cells are extracted from a SDH frame.

(4) A discarded cell number Cdis (=20 cells) that is counted in the discard cell counter 9 (▽) of the cell flow controlling/charging unit 46 is informed to the firmware 48. The discarded cell number Cdis detected in the cell flow controlling/charging unit 46 is equal to a cell number discarded in the cell regulating unit (UPC/NPC) 45 due to out-band.

(5) A passage cell number Cout (=60 cells), which indicates a number of outgoing cells from the input circuit interface device 1, counted in the passage cell counter (■) of the cell flow controlling/charging unit 46 is informed to the firmware 48.

The firmware 48 calculates the difference D based on the counted cell numbers as follows:

$$D=Cin-(Cdis+Cout)-Cco$$

In the above mentioned example, the difference D is calculated as follows.

$$D=100-(30+60)-5=5$$

Since a number of out-band cells, which are discarded in the cell regulating unit (UPC/NPC) 45, is excluded when the firmware 48 calculates the difference D, the difference D should be zero in normal operation. That is, if the difference D is non-zero value as above, it means a generation of a hardware fault. The firmware 48 informs the controller CC of the difference D as the fault warning.

Cell Multiplexing Device 2a

Figure 5:
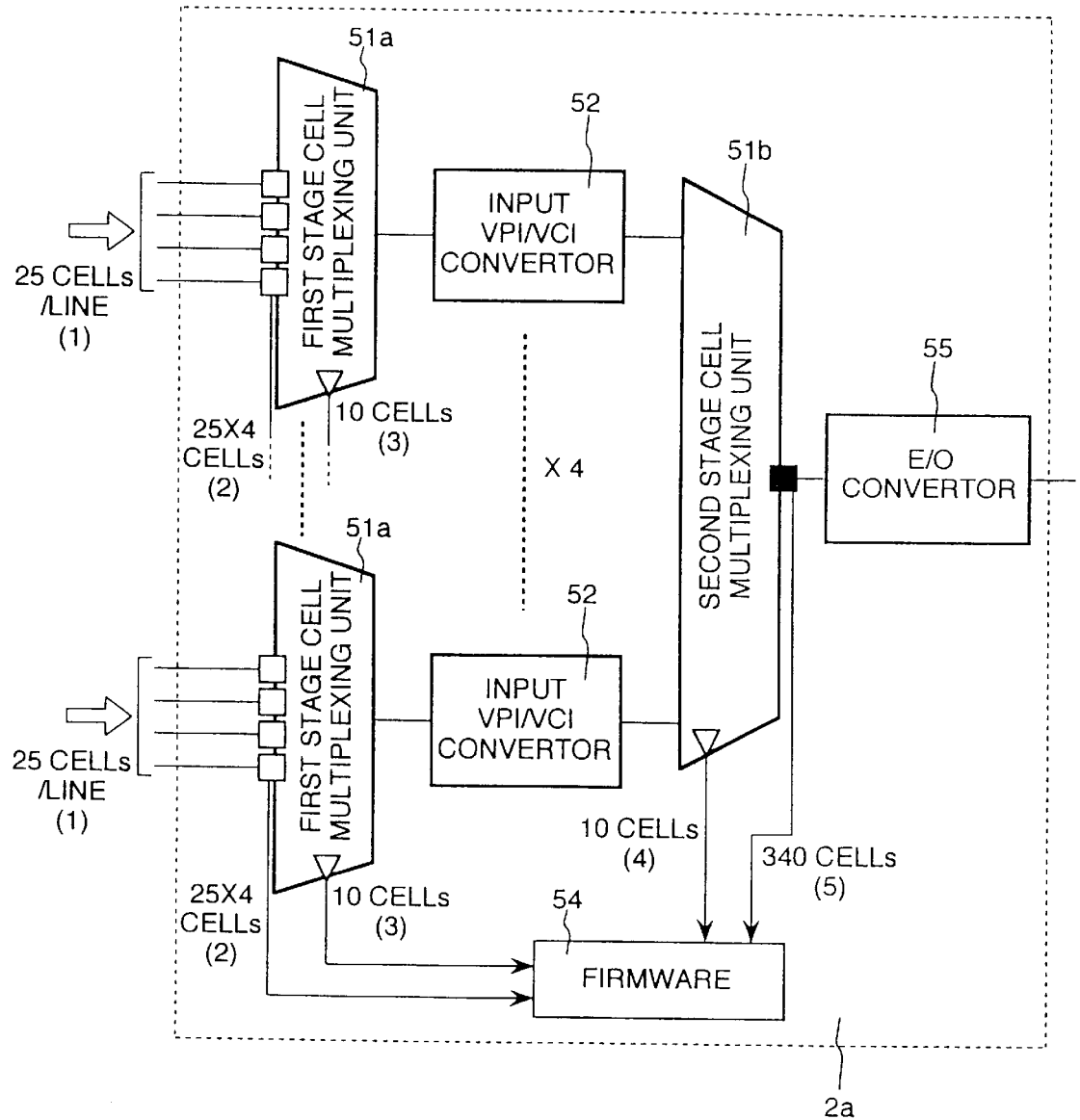
FIG. 5 is a functional block diagram showing construction of a cell multiplexing device according to the embodiment.

As shown in FIG. 5, the cell multiplexing device 2a comprises fist stage multiplexing units 51a, 51a, . . . , input VPI/VCI convertors 52, 52, . . . , a second (final) stage multiplexing unit 51b and a photoelectric convertor (E/O) 55. Although the device 2a includes four units of the first stage multiplexing unit 51a and four units of the input VPI/VCI convertor 52, two of four are only illustrated in FIG. 5 for each of units 51a and 52.

Four input lines and one output line are connected to the respective first stage multiplexing unit 51a. All of the first stage multiplexing units 51a are connected to the second stage multiplexing unit 51b via the input VPI/VCI convertors 52. The photoelectric convertor (E/O) 55 converts electric signal from the second stage multiplexing unit 51b into optical signal for output.

The cell multiplexing device 2b in the standby system has the same construction as the device 2a in the actual system.

The first stage cell multiplexing unit 51a is provided with the four inflow cell counters 8 (□) corresponding to the input lines and the single discard cell counter 9 (▽). Further, the second stage multiplexing unit 51b is provided with the passage cell counter 11 (■) and the discard cell counter 9 (▽).

One example of the cell calculation in the cell multiplexing device 2a will be explained hereinafter.

It is assumed that five cells are actually passing between the inflow cell counter 8 (□) and the passage cell counter (■) in the cell multiplexing device 2a. That is, the compensation value Cco equals five.

(1) Twenty five (25) cells are input to each the input line of the first stage multiplexing unit 51a. Since each of the four units has four input lines, the total input cell number equals four hundreds (400).

(2) Inflow cell numbers Cin (=25 cells/line) that are counted in the inflow cell counters (□) of the first stage multiplexing units 51a are informed to the firmware 54.

(3) Discarded cell numbers Cdis (=10 cells/unit) that are counted in the discard cell counters 9 (▽) of the first stage multiplexing units 51a are informed to the firmware 54. The number Cdis is a number of cells discarded at a buffer when cells are multiplexed in the first stage multiplexing unit 51a.

(4) A discarded cell number Cdis (=10 cells) that is counted in the discard cell counter 9 (▽) of the second stage cell multiplexing unit 51b is informed to the firmware 54. The number Cdis is a number of cells discarded at a buffer when cells are multiplexed in the second stage multiplexing unit 51b.

(5) A passage cell number Cout (=340 cells), which indicates a number of outgoing cells from the cell multiplexing device 2a, counted in the passage cell counter 11 (■) of the second stage cell multiplexing unit 51b is informed to the firmware 54.

The firmware 54 calculates the difference D based on the counted cell numbers as follows:

$$D=Cin-(Cdis+Cout)-Cco$$

In the above mentioned example, the total number of Cin equals 400 (=25×4×4) and the total number of Cdis equals 50 (=10×4+10), the difference D is calculated as follows.

$$D=400-(50+340)-5=5$$

Since the number of cells that are discarded at the time of the multiplexing is excluded when the firmware 54 calculates the difference D, the difference D should be zero in normal operation. That is, if the difference D is non-zero value as above, it means a generation of a hardware fault. The firmware 54 informs the controller CC of the difference D as the fault warning.

Cell Switching Device 3a

Figure 6:
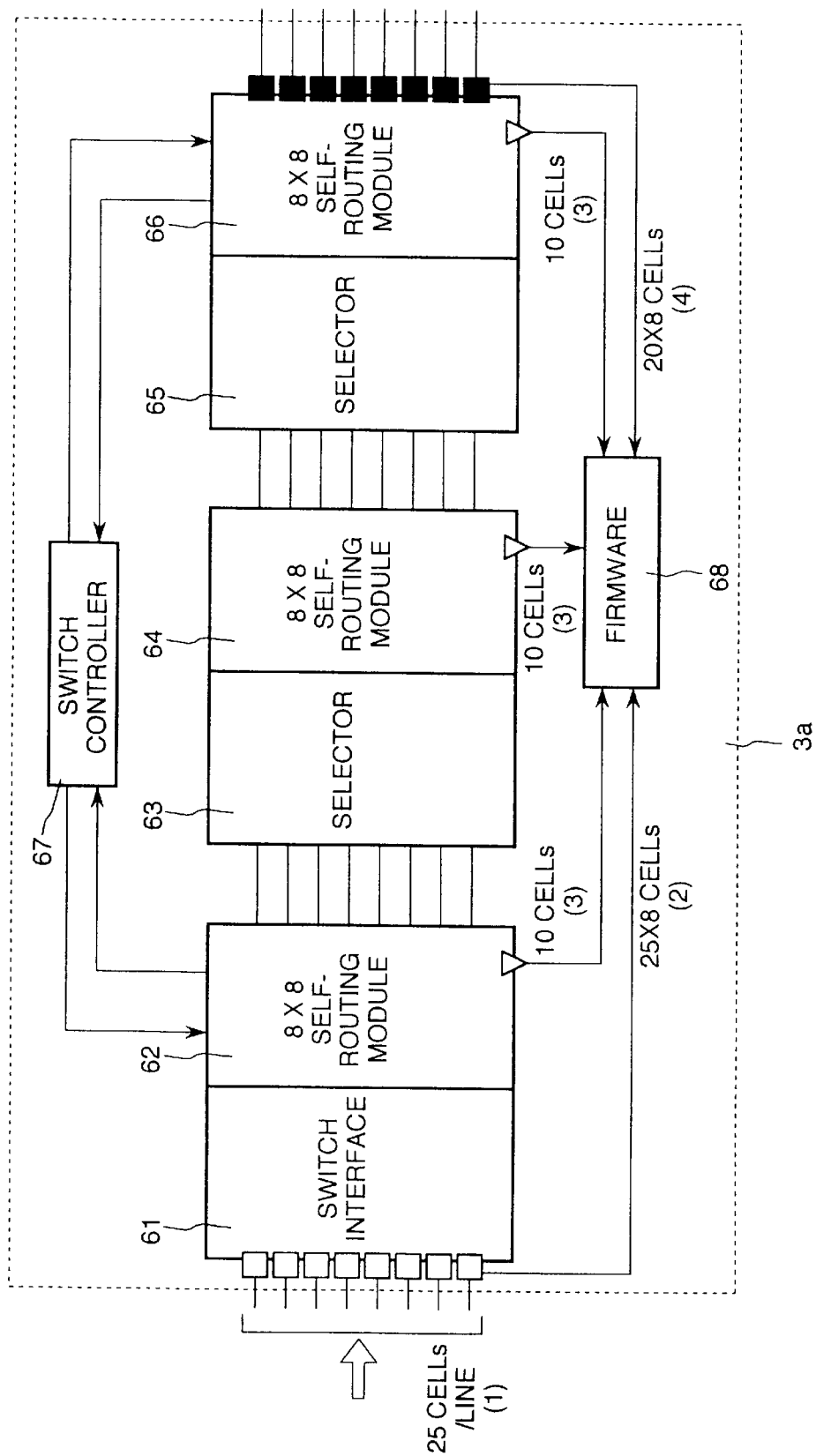
FIG. 6 is a functional block diagram showing construction of a cell switching device according to the embodiment.

As shown in FIG. 6, the cell switching device 3a comprises a switch interface unit 61 to which eight input lines are connected, first, second and third self-routing modules 62, 64 and 66 that form 8×8 matrix, first and second selectors 63 and 65, and a switch controller 67.

The cell switching device 3b in the standby system has the same construction as the device 3a in the actual system.

The switch interface unit 61 is provided with the eight inflow cell counters 8 (□) corresponding to the input lines. Each of the self-routing modules 62, 64 and 66 is provided with the discard cell counter 9 (▽). Further, the third self-routing module 66 is provided with the eight passage cell counter 11 (■) corresponding to the output lines.

One example of the cell calculation in the cell switching device 3a will be explained hereinafter.

It is assumed that five cells are actually passing between the inflow cell counter 8 (□) and the passage cell counter 11 (■) in the cell switching device 3a. That is, the compensation value Cco equals five.

(1) Twenty five (25) cells are input to each the input line of the switch interface unit 61. Since the unit 61 has eight input lines, the total input cell number equals two hundreds (200).

(2) Inflow cell numbers Cin (=25 cells/line) that are counted in the inflow cell counters 8 (□) of the switch interface unit 61 are informed to the firmware 68.

(3) Discarded cell numbers Cdis (=10 cells/unit) that are counted in the discard cell counters 9 (▽) of the self-routing modules 62, 64 and 66 are informed to the firmware 68. The number Cdis is a number of cells discarded at each of the self-routing modules.

(4) Passage cell numbers Cout (=20 cells/line) that are counted in the passage cell counters 11 (■) of the third self-routing module 66 are informed to the firmware 68. Since the module 66 has eight output lines, the total output cell number equals one hundred and sixty (160).

The firmware 68 calculates the difference D based on the counted cell numbers as follows:

$$D=Cin-(Cdis-Cout)-Cco$$

In the above mentioned example, the total number of Cin equals 200 (=25×8) and the total number of Cdis equals 30 (=10×3), the difference D is calculated as follows.

$$D=200-(30+160)-5=5 \text{ cells}$$

Since the number of cells that are discarded at the self-routing modules is excluded when the firmware 68 calculates the difference D, the difference D should be zero in normal operation. That is, if the difference D is non-zero value as above, it means a generation of a hardware fault. The firmware 68 informs the controller CC of the difference D as the fault warning.

Cell Demultiplexing Device 4a

Figure 7:
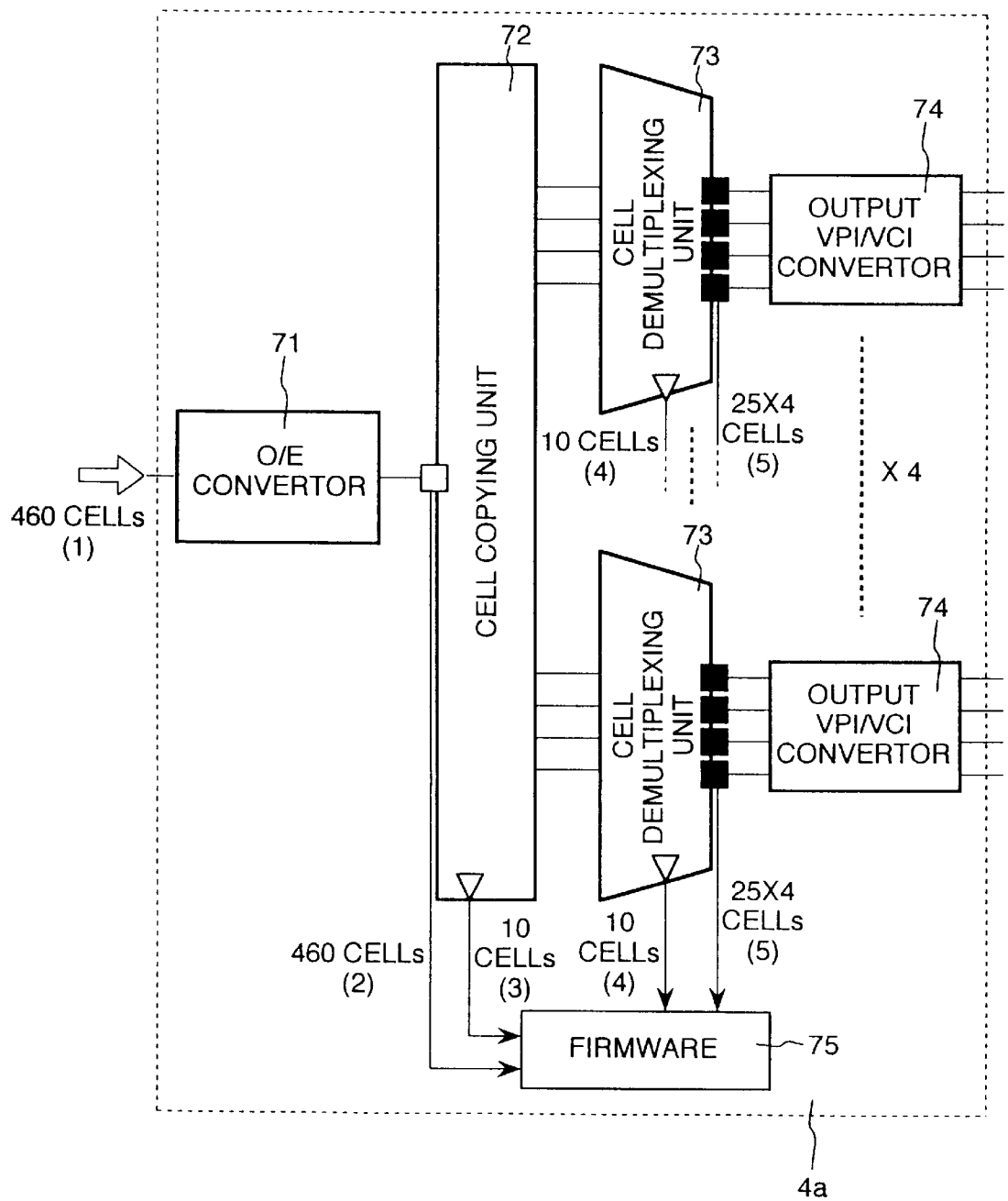
FIG. 7 is a functional block diagram showing construction of a cell demultiplexing device according to the embodiment.

As shown in FIG. 7, the cell demultiplexing device 4a comprises a photoelectric convertor (O/E) 71 at an input side, a cell copying unit 72, cell demultiplexing units 73, 73, . . . that are connected with the cell copying unit 72 side by side, and output VPI/VCI convertors 74, 74, . . . that are connected with the cell demultiplexing units 73 respectively.

Although the device 4a includes four units of the cell demultiplexing unit 73 and four units of the output VPI/VCI convertor 74, two of four are only illustrated in FIG. 7 for each of units 73 and 74.

The cell copying unit 72 has a one input line and sixteen output lines. Each of the cell demultiplexing units 73 has four input lines and four output lines. And also, each of the output VPI/VCI convertors 74 has four input and output lines.

The cell demultiplexing device 4b in the standby system has the same construction as the device 4a in the actual system.

The cell copying unit 72 is provided with the inflow cell counter 8 (□) and the discard cell counter 9 (▽). Each of the cell demultiplexing units 73 is provided with the discard cell counter 9 (▽) and the four passage cell counter (■) corresponding to the output lines.

One example of the cell calculation in the cell demultiplexing unit 4a will be explained hereinafter.

It is assumed that five cells are actually passing between the inflow cell counter 8 (□) and the passage cell counter 11 (■) in the cell demultiplexing device 4a. That is, the compensation value Cco equals five.

(1) Four hundreds sixty (460) cells are input to the photoelectric convertor (O/E) 71.

(2) An inflow cell number Cin (=460 cells) that is counted in the inflow cell counter 8 (□) of the cell copying unit 72 is informed to the firmware 75.

(3) A discarded cell number Cdis (=10 cell) that is counted in the discard cell counters 9 (▽) of the cell copying unit 72 is informed to the firmware 75. The number Cdis is a number of cells discarded at a buffer when cells are copied in the cell copying unit 72.

(4) Discarded cell numbers Cdis (=10 cells/unit) that are counted in the discard cell counters 9 (▽) of the cell demultiplexing units 73 are informed to the firmware 75. The number Cdis is a number of cells discarded at a buffer of the cell demultiplexing unit 73.

(5) Passage cell numbers Cout (=25 cells/line) that are counted in the passage cell counters 11 (■) of the cell demultiplexing unit 73 are informed to the firmware 75. Since the unit 73 has four output lines, the total output cell number equals four hundreds (400).

The firmware 75 calculates the difference D based on the counted cell numbers as follows:

$$D=Cin-(Cdis+Cout)-Cco$$

In the above mentioned example, the total number of Cdis equals 50 (=10+10×4) and the total number of Cout equals 400 (=25×4×4), the difference D is calculated as follows.

$$D=460-(50+400)-5=5 \text{ (cells)}$$

Since the number of cells that are discarded at the cell copying unit 72 and the cell demultiplexing unit 73 is excluded when the firmware 75 calculates the difference D, the difference D should be zero in normal operation. That is, if the difference D is non-zero value as above, it means a generation of a hardware fault. The firmware 75 informs the controller CC of the difference D as the fault warning.

Output Circuit Interface Device 5

Figure 8:
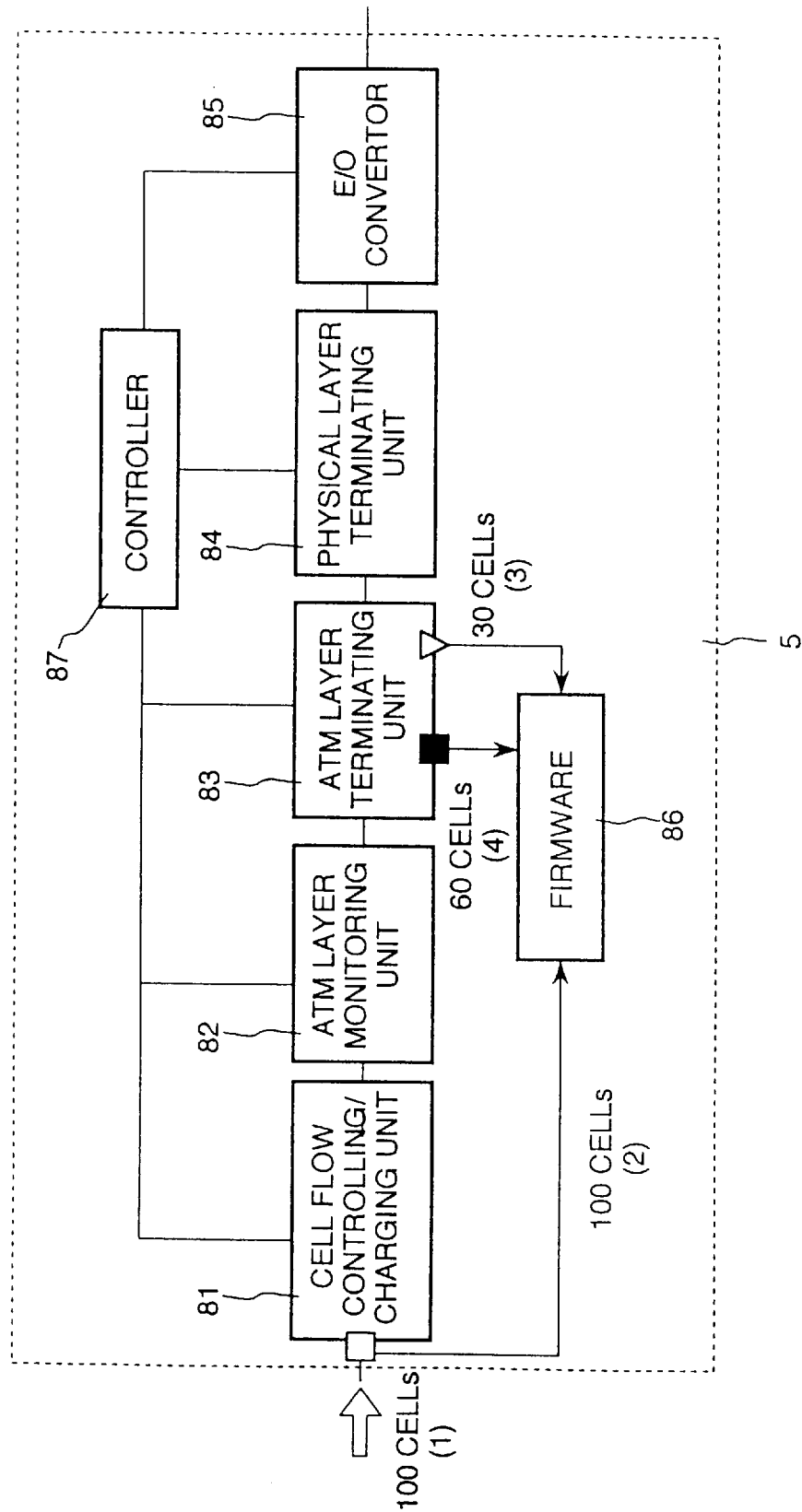
FIG. 8 is a functional block diagram showing construction of an output circuit interface device according to the embodiment.

As shown in FIG. 8, the output circuit interface device 5 comprises a cell flow controlling/charging unit 81, an ATM layer monitoring unit 82, an ATM layer terminating unit 83, a physical layer terminating unit 84, a photoelectric convertor (E/O) 85 and a controller 87 that controls the units 81 through 85. Although a firmware 86 is installed in the controller 87, it is shown as a separate block in FIG. 8.

The inflow cell counter 8 (□) is placed in the cell flow controlling/charging unit 81. The discard cell counter 9 (▽) and the passage cell counter 11 (■) are placed in the ATM layer terminating unit 83.

One example of the cell calculation in the output circuit interface device 5 will be explained hereinafter.

It is assumed that five cells are actually passing between the inflow cell counter 8 (□) and the passage cell counter 11 (■) in the output circuit interface device 5. That is, the compensation value Cco equals five.

(1) A hundred (100) cells are input to the output circuit interface device 5.

(2) A inflow cell number Cin (=100 cells) that is counted in the inflow cell counter 8 (□) of the cell flow controlling/charging unit 81 is informed to the firmware 86.

(3) A discarded cell number Cdis (=30 cells) that is counted in the discard cell counter 9 (▽) is informed to the firmware 86. The discarded cell number Cdis detected in the ATM terminating unit 83 is equal to a cell number discarded in a buffer when cells are inserted into a SDH frame.

(4) A passage cell number Cout (=60 cells) that is counted in the passage cell counter 11 (■) of the ATM layer terminating unit 83 is informed to the firmware 86.

The firmware 86 calculates the difference D based on the counted cell numbers as follows:

$$D=Cin-(Cdis+Cout)-Cco$$

In the above mentioned example, the difference D is calculated as follows.

$$D=100-(30+60)-5=5$$

Since a number of cells, which are discarded when cells are inserted into a SDH frame, is excluded when the firmware 86 calculates the difference D, the difference D should be zero in normal operation. That is, if the difference D is non-zero value as above, it means a generation of a hardware fault. The firmware 86 informs the controller CC of the difference D as the fault warning.

According to the embodiment, the fault warning is informed to the controller when any devices detect the non-zero difference. As a result, the operation can be quickly switched from the actual system to the standby system, it makes a stopped period of cell transmission shorten.

What is claimed is:

1. An ATM exchange that contains a plurality of component devices on a cell passage channel, at least one component device of said ATM exchange comprising:

an inflow cell counter that counts inflow cell number into said component device;

a discard cell counter that counts discarded cell number at said component device;

a passage cell counter that counts outflow cell number from said component device; and a controller that subtracts discard cell number and passage cell number from inflow cell number and issues a fault warning when the difference becomes larger than predetermined threshold value.

2. The ATM exchange according to claim 1, wherein said controller detects a compensation value that is a number of cells that are actually passing between said inflow cell counter and said passage cell counter in said component device and wherein said controller subtracts said discard cell number, said passage cell number and said compensation value from said inflow cell number to calculate said difference.

3. The ATM exchange according to claim 1, wherein said controller issues the fault warning when the difference becomes non-zero value.

4. The ATM exchange according to claim 1, wherein said component device is an input circuit interface device that comprises an ATM layer terminating unit and a cell flow controlling/charging unit, and wherein said inflow cell counter is placed in an ATM layer terminating unit, said passage cell counter is placed in said cell flow controlling/charging unit and said discard cell counter is placed in both of said ATM layer terminating unit and said cell flow controlling/charging unit.

5. The ATM exchange according to claim 1, wherein said component device is a cell multiplexing device that contains multistage cell multiplexing units, and wherein said inflow cell counter is placed in a first stage cell multiplexing unit, said passage cell counter is placed in a second stage cell multiplexing unit and said discard cell counter is placed in the cell multiplexing units in any stages.

6. The ATM exchange according to claim 1, wherein said component device is a cell switching device that contains multistage cell switching modules, and wherein said inflow cell counter is placed in a first stage cell switching module, said passage cell counter is placed in a third stage cell switching module and said discard cell counter is placed in the cell switching modules in any stages.

7. The ATM exchange according to claim 1, wherein said component device is a cell demultiplexing device that contains a cell copying unit and a cell demultiplexing unit, and wherein said inflow cell counter is placed in said cell copying unit, said passage cell counter is placed in the cell demultiplexing unit and said discard cell counter is placed in both of said cell copying unit and said cell demultiplexing unit.

8. The ATM exchange according to claim 1, wherein said component device is an output circuit interface device that comprises an ATM layer terminating unit and a cell flow controlling/charging unit, and wherein said inflow cell counter is placed in said cell flow controlling/charging unit, said passage cell counter and said discard cell counter are placed in said ATM layer terminating unit.

* * * * *